(12) United States Patent
Bagüés (10) Patent No.: US 7,137,819 B2
(45) Date of Patent: Nov. 21, 2006

(54) APPARATUS, SYSTEM, AND METHOD FOR TEACHING SEQUENCING PRINCIPLES

(76) Inventor: Diane Bagüés, 2013 SE. Waldron Rd., Milwaukie, OR (US) 97222

( * ) Notice: Subject to any disclaimer, the term of this patent is extended or adjusted under 35 U.S.C. 154(b) by 0 days.

(21) Appl. No.: 10/950,276

(22) Filed: Sep. 24, 2004

(65) Prior Publication Data

US 2005/0069843 A1 Mar. 31, 2005

Related U.S. Application Data

(60) Provisional application No. 60/523,641, filed on Nov. 20, 2003, provisional application No. 60/506,078, filed on Sep. 25, 2003.

(51) Int. Cl.
*G09B 19/02* (2006.01)
*A63F 9/08* (2006.01)

(52) U.S. Cl. ............... 434/188; 434/191; 434/201; 273/153 R (58) Field of Classification Search ............... 434/188, 434/191, 193, 195, 198, 199, 201, 205, 207, 434/208; 273/153 R, 153 S, 156
See application file for complete search history.

(56) References Cited

U.S. PATENT DOCUMENTS

| | | | | |
|---|---|---|---|---|
| 3,819,188 A | * | 6/1974 | Freedman | 273/160 |
| 3,827,162 A | * | 8/1974 | Moeser | 434/193 |
| 3,918,178 A | * | 11/1975 | Riley | 434/193 |
| 4,149,717 A | | 4/1979 | Seijiro | 273/1 R |
| 4,323,238 A | | 4/1982 | Jernstrom et al. | 273/1 G |
| 4,349,197 A | | 9/1982 | Livick | 273/1 GF |
| 4,692,119 A | * | 9/1987 | Ussery | 434/259 |
| 4,846,687 A | * | 7/1989 | White et al. | 434/112 |
| 5,040,987 A | * | 8/1991 | Frazier | 434/188 |
| 5,074,794 A | * | 12/1991 | Von Hagen | 434/193 |
| 5,125,661 A | | 6/1992 | Jarboe | 273/156 |
| 5,314,338 A | | 5/1994 | Caveza et al. | 434/259 |
| 5,330,186 A | | 7/1994 | Jones | 273/153 S |
| 5,411,261 A | | 5/1995 | Jacques | 273/156 |
| 5,419,558 A | | 5/1995 | Jones | 273/153 S |
| D371,172 S | | 6/1996 | Foreshew | D21/104 |
| 5,611,536 A | | 3/1997 | Foreshew | 273/153 S |
| 5,674,103 A | | 10/1997 | Bean | 446/75 |
| 5,769,639 A | * | 6/1998 | Foster | 434/159 |
| 5,868,393 A | * | 2/1999 | Williams | 273/299 |
| 6,074,212 A | * | 6/2000 | Cogliano | 434/159 |
| D440,044 S | | 4/2001 | Williams | D3/284 |
| 6,209,875 B1 | * | 4/2001 | Vildosola | 273/302 |

(Continued)

OTHER PUBLICATIONS http://www.cleverwood.com/images/jpb_4m3s.jpg, http://store5.yimg.com/l/mcclellin_1753_2424049.

*Primary Examiner*—Kurt Fernstrom
(74) *Attorney, Agent, or Firm*—Kunzler & Associates (57) ABSTRACT

An apparatus, system, and method are disclosed for teaching sequencing principles. An educational toy is provided with a plurality of panels that interlock with each other in a sequential pattern to form a multi-sided enclosure. A coded element may be represented on at least one of the panels. The coded element may be an element in a series forming a sequence to indicate the sequence pattern of the various panels. The sequence code or pattern to open the multi-sided enclosure is encrypted in the structural design of the various panels. Additional educational material may be represented on the various panels. In addition, an object containing educational material thereon may be included in the interior of the multi-sided enclosure.

21 Claims, 7 Drawing Sheets

U.S. PATENT DOCUMENTS

| | | | |
|---|---|---|---|
| 6,231,345 B1 | 5/2001 | Yamazaki et al. | 434/259 |
| 6,241,248 B1 | 6/2001 | Winter | 273/153 S |
| 6,361,045 B1 | 3/2002 | Bernstein | 273/157 R |
| 6,422,560 B1 * | 7/2002 | Harbaugh | 273/157 R |
| 2002/0111106 A1 | 8/2002 | Bollman | 446/71 |
| 2003/0038423 A1 | 2/2003 | Turner et al. | 273/157 R |

* cited by examiner

APPARATUS, SYSTEM, AND METHOD FOR TEACHING SEQUENCING PRINCIPLES

CROSS-REFERENCES TO RELATED APPLICATIONS

This application is a continuation-in-part of and claims priority to U.S. Provisional Patent Application No. 60/506,078 entitled "EDUCATIONAL PUZZLE BOX" and filed on Sep. 25, 2003, and U.S. Provisional Patent Application No. 60/523,641 entitled "EDUCATIONAL PUZZLE BOX" and filed on Nov. 20, 2003, for Diane Bagüés, which are incorporated herein by reference.

BACKGROUND OF THE INVENTION

1. Field of the Invention

This invention relates to educational toys and more particularly relates to educational toys for teaching sequencing principles.

2. Description to the Related Art

Toys generally provide entertainment for children during important development years. Often parents and educators utilize toys to teach children educational principles. Certain toys can be designed to target the educational needs and the developmental skills of specific developmental age groups. In certain instances, traditional toys may be altered to include specific educational elements intended to advance a child's capabilities. Such improvements can significantly contribute to the child's overall development and can increase the child's capacity for continued learning.

A traditional toy that has amazed and entertained audiences of all ages for more than one hundred years is the Japanese puzzle box. The puzzle boxes are wooden boxes traditionally decorated with geometric designs. Typically, the puzzle boxes have been used as jewelry boxes or "secret boxes" to guard special items. From the outer surface, the puzzle boxes appear to be completely enclosed because the boxes have no hinges, no locks, and no lids or coverings. Consequently, the user must learn a special sequence code designed specifically for each puzzle box prior to opening the box.

The sequence code to open the box is encrypted in the structural design of the side panels of the puzzle box. More specifically, the side panels are designed to uniquely engage adjacent side panels. As a result, the side panels may only be removed in a particular order because specially designed side panels block or prevent the removal of earlier inserted side panels.

For example, a side panel typically comprises grooves configured to slideably receive lips of an adjacent side panel. The grooves facilitate sliding the side panel in a particular direction relative to the adjacent side panels. The side panels generally slide or move in different directions and in various ways. Side panels may include one or more holes and/or one or more corresponding protrusions to complicate the sequence code of the puzzle box. The holes and protrusions create built-in stops to hold the side panels in place. The uniquely formed side panels, consequently, allow the puzzle boxes to have a distinct sequence code, or panel order, in order to completely assemble or disassemble a particular puzzle box.

The puzzle boxes, however, have various disadvantages from an educational perspective. Because the puzzle boxes typically contain geometric markings, the side panel sequence may be difficult to learn or distinguish, dramatically increasing the difficulty level of the toy. As a result, small children fail to benefit from the elements of problem solving and perseverance that motivate young adults with more advanced skills to decode the puzzle. In addition, the puzzle boxes only focus on one educational skill: correctly assembling the various panels to form a box. Other skills such as sequencing, counting, reading, communication, and the like are completely neglected.

From the foregoing discussion, it should be apparent that a need exists for an apparatus, system, and method that improve the traditional puzzle box in order to teach educational principles. Beneficially, such an apparatus, system, and method would teach sequencing principles as a multi-sided enclosure is assembled and disassembled. Additionally, various panels of the multi-sided enclosure would include educational material and coded elements to supplement the educational impact of the toy.

SUMMARY OF THE INVENTION

The present invention has been developed in response to the present state of the art, and in particular, in response to the problems and needs in the art that have not yet been fully solved by currently available children's toys. Accordingly, the present invention has been developed to provide an apparatus, system, and method for teaching sequencing principles that overcome many or all of the above-discussed shortcomings in the art.

An educational toy is provided with a plurality of panels that interlock with each other in a sequential pattern to form a multi-sided enclosure. One example of a multi-sided enclosure is a puzzle box. A coded element, which may be an element in a series forming a sequence, may be represented on at least one of the panels that form the sides of the enclosure. In one embodiment, the coded element is an Arabic numeral indicating the order in which the user removes the panels of the educational toy. In a further embodiment, the side panels may comprise one or more Braille characters. The Braille characters maybe a transcription of the coded element, or may be the coded element. A multi-sided enclosure of the present invention may contain a plurality of coded elements. In addition, the multi-sided enclosures may comprise one or more additional elements that do not necessarily correspond to the coded element or to the sequence pattern of the panels.

In certain embodiments, the multi-sided enclosure contains representations of deaf finger alphabet signs. Consequently, the multi-sided enclosure may be used to teach educational skills to those with disabilities, or to teach awareness and communication skills to children without disabilities. In addition, the multi-sided enclosure may have one or more sound chips embedded into a side panel to teach additional educational principles. In one embodiment, the sound chip communicates the coded element. In an alternative embodiment, the sound chip communicates the pronunciation of one or more words. In certain embodiments, the multi-sided enclosure may be used to teach words in foreign languages. To add variety to the sequence materials, the multi-sided enclosure may include removable inserts that can be connected to the outer surface of at least one side panel. The inserts may comprise a coded element.

The apparatus, in one embodiment, further comprises panels having grooves and lips that uniquely engage adjacent panels to form the panel sequence code. In addition, the panels may comprise holes and protrusions to prevent non-sequential removal of the panels. As a result, the panels can only be assembled and disassembled following a specific sequence that may be used to teach children sequencing principles.

The apparatus is further configured, in one embodiment, to provide a series of multi-sided enclosures. The various multi-sided enclosures in the series may target a specific developmental group. In addition, the multi-sided enclosures may comprise a different number of panels and numerous moves to assemble and disassemble the enclosure. The grooves, lips, holes, protrusions, and the like on the panels may be selected to increase the difficulty of assembling or disassembling the multi-sided enclosure. The different configurations and sequence codes may advance the educational level of a specific embodiment of a multi-sided enclosure.

A system of the present invention is also presented to teach sequencing principles. The system may be embodied in a multi-sided enclosure having a plurality of panels that interlock with each other in a sequential pattern to form an interior. At least one panel may comprise a coded element. In particular, the system, in one embodiment, includes an object disposed within the interior of the multi-sided enclosure. Preferably, the object has educational material represented thereon. In certain embodiments, the object comprises a cube. Alternatively, the object may be another multi-sided enclosure.

A method of the present invention is also presented for teaching sequencing principles. The method in the disclosed embodiments substantially includes the steps necessary to carry out the functions presented above with respect to the operation of the described apparatus and system. In one embodiment, the method includes providing a multi-sided enclosure with a plurality of panels that interlock with each other in a sequential pattern. The method also may include configuring at least one of the panels with a coded element and assembling the multi-sided enclosure according to the sequence indicated by the coded element on the panel.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
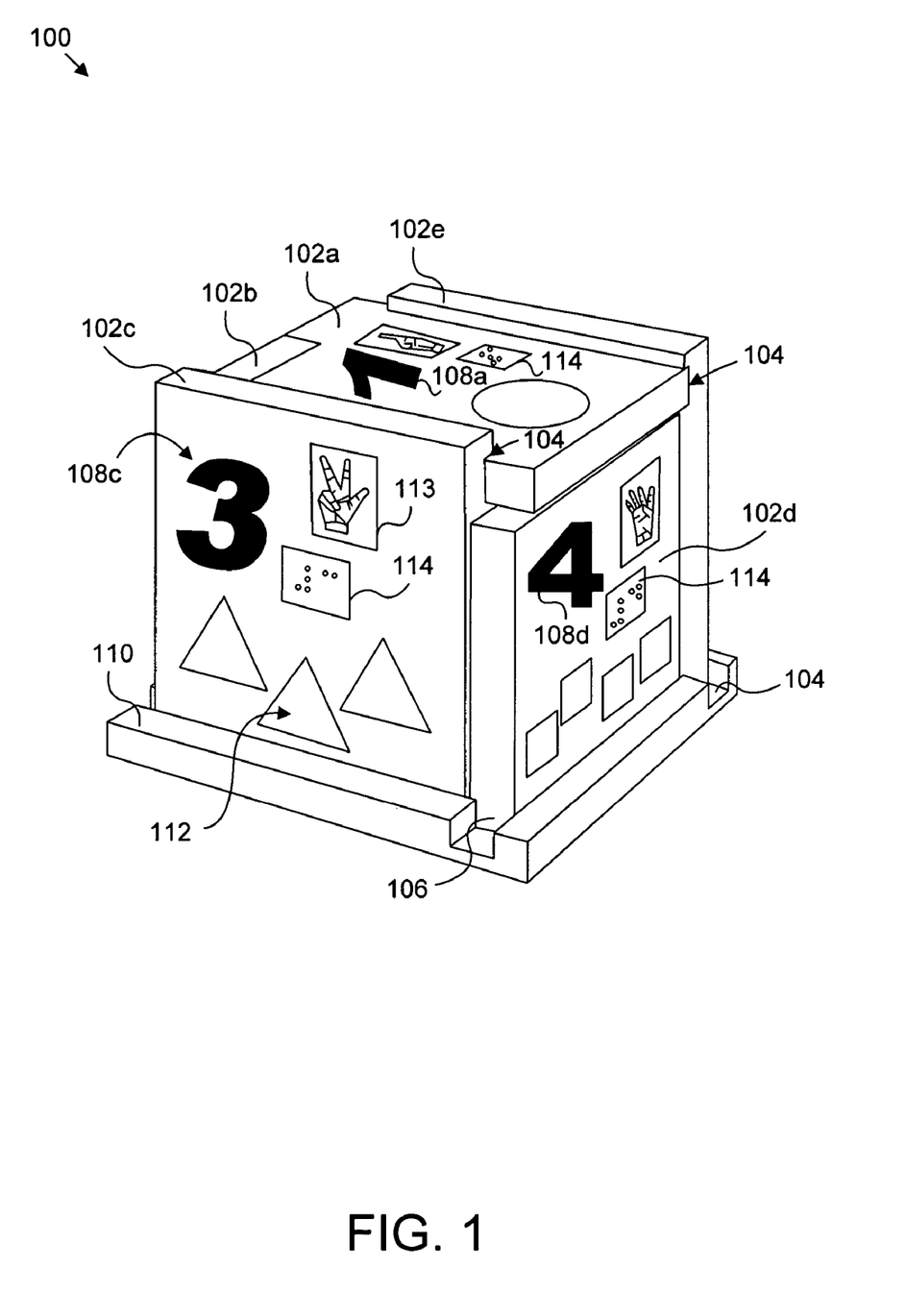
FIG. 1 is a perspective view of one embodiment of a multi-sided enclosure in accordance with the present invention.

FIG. 1 illustrates one embodiment of an educational multi-sided enclosure 100. The multi-sided enclosure 100 of the present invention provides an educational toy that utilizes sequence codes similar to the sequence codes of traditional puzzle boxes in order to teach children educational principles. In one embodiment, the multi-sided enclosure 100 is a puzzle box. The multi-sided enclosure 100 in the depicted embodiment includes side panels 102 and a base side panel 110. The base side panel 110 may comprise grooves 104 to receive the side panels 102. In certain embodiments, the base side panel 110 and the side panel 102 are classified as panels; however, for illustrative purposes, the base side panel 110 and the side panel 102 are referred to separately. A panel 102, 110 may be a component of a periphery of an enclosure 100 and may be flat, but need not necessarily be so.

The sequence code or pattern to open the multi-sided enclosure 100 is encrypted in the structural design of the panels 102, 110. As such, the panels 102, 110 may include lips 106, grooves 104, holes, protrusions (not shown) and the like to create the panel sequence code, which will be discussed in greater detail below. The number of panels 102, 110 and the sequence code to open the multi-sided enclosure 100 may vary according to the specific embodiment. In some embodiments, the assembled results may be comprised of a multiplicity of panels 102, 110 that may create a final result of some number of sides other than six, and a final shape that is comprised of other than six sides.

Side panels 102, 110 may contain one or more coded elements 108 to indicate the sequence code or panel order of a particular multi-sided enclosure 100. In one embodiment, following the order of the coded elements 108 visible on the side panels 102, 110 enables the user to remove the side panels 102 in the correct sequence to disassemble the multi-sided enclosure 100. For example, the first coded element 108 indicates which side panel 102 must be removed first in order to proceed to disassemble the multi-sided enclosure 100. Accordingly, the second coded element 108 may indicate the second side panel 102 and so forth.

For simplicity, in the depicted embodiment, the multi-sided enclosure 100 comprises five side panels 102 and a base side panel 110 forming a cube. Instead of comprising traditional geometric designs, as is traditional for Japanese puzzle boxes, the side panels 102 contain numbers that function as coded elements 108 to reveal the sequence code of the multi-sided enclosure 100. The coded element 108 may be any element that can represent a sequence, such as numeric symbols, alphabetic symbols, words, music notes, pictures, and the like. The coded element 108 may additionally teach children educational principles, for example, to count, read, spell, communicate, recognize sequences, identify music scales, etc. In one embodiment, the coded elements 108 may even contain sequential representations of literature, such as Bible stories, fairy tales, or children's stories, to help children learn the order of events and consequences. Coded elements 108 may be combined on a panel 102, 110 to add variety and increased educational value to the multi-sided enclosure 100.

In one embodiment, the coded element 108 may be a written music note. Furthermore, the side panel 102 may include an embedded sound chip that represents the specific music note. The user consequently learns to recognize the written music note as well as the corresponding tone of the note. Such an embodiment when applied to the side panels 102 of the multi-sided enclosure 100 may additionally teach the sequence of the music scale. Any coded element 108 that represents a sequence, such as days of the weeks, months of the year, the order of the planets, scientific laws, etc., may be used to represent the panel sequence code.

In certain embodiments, the educational multi-sided enclosure 100 may be further designed to communicate educational principles to children who are blind or visually impaired. By texturing the surface of the multi-sided enclosure 100 with Braille 1 14 or other recognizable symbols, or by implementing sound chips into the side panels 108 of the multi-sided enclosure 100, visually impaired children may also learn educational principles from the present invention. However, the scope of the invention is not limited to this purpose.

The multi-sided enclosure 100 may also benefit those who are hearing impaired. In certain embodiments, the multi-sided enclosure 100 may further include a deaf finger alphabet sign 113 to teach educational principles such as counting and communication.

Moreover, the present invention in one embodiment may offer a series of multi-sided enclosures 100 that include various levels of educational advancement. The first and most basic level may comprise a simple multi-sided enclosure 100 that includes a basic numeric sequence and an obvious panel sequence code. Accordingly, a multi-sided enclosure 100 of the following level may include an alphabet letter sequence or the like and a more complex sequence code; while additional levels may comprise more advanced number sequences, complicated sequence codes, words in a plurality of languages, and so forth.

In the series of educational multi-sided enclosures 100, each multi-sided enclosure 100 preferably follows a unique sequence code of varying complexity to disassemble the multi-sided enclosure 100. As the level of the multi-sided enclosure 100 increases, each side panel 102 may comprise an increased number of grooves 104, lips 106, holes (not shown), protrusions (not shown), and the like to create a more complicated sequence code. As a child's knowledge or ability increases, the subsequent multi-sided enclosures 100 in the series are intended to continually test the child's capabilities.

In a contemplated embodiment, the illustrated multi-sided enclosure 100 may be an example of a first multi-sided enclosure 100 in a series of educational multi-sided enclosures 100. A multi-sided enclosure 100 containing six side panels 102 (including the base side panel 110) generally has a basic sequence code of five moves, one move for each side panel 102 (excluding the base side panel 110). In such an embodiment, a user must remove a first side panel 102a marked with the first of a sequence of coded elements 108a in order to continue disassembling the multi-sided enclosure 100.

Figure 2:
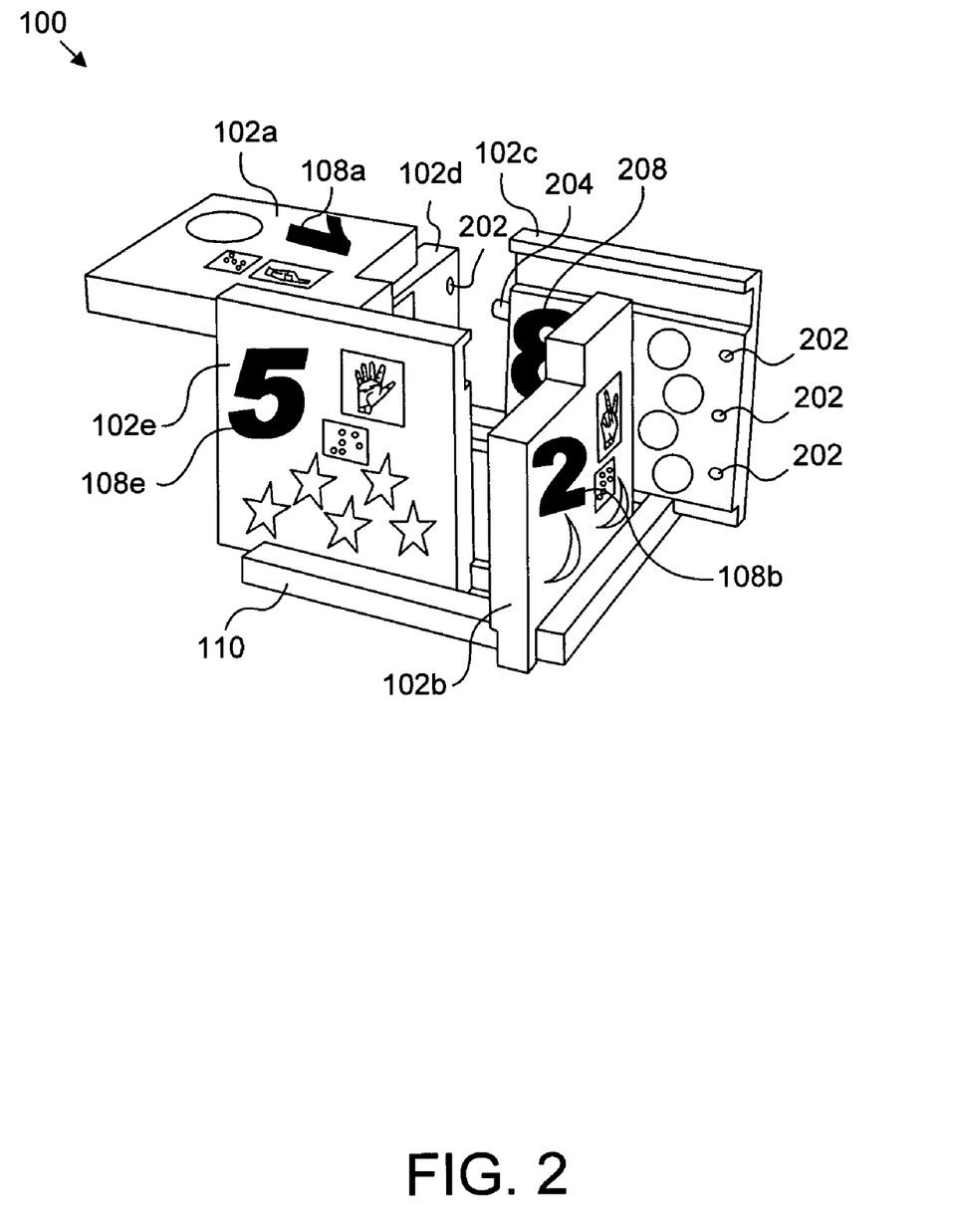
FIG. 2 is a perspective view illustrating a plurality of uniquely engaging panels in accordance with the present invention.

FIG. 2 illustrates in greater detail one embodiment of a multi-sided enclosure 100 with the panels 102 partially disassembled. Once the first side panel 102a is removed, the user may then remove the second side panel 102b with the second coded element 108b on the outside, because the protruding portion of the first side panel 102a no longer blocks the second side panel 102b. Then the third panel 102c may be removed; next, the fourth panel 102d, and so on until the sixth base panel 110 remains isolated, unattached to the other side panels 102. Once this state is achieved, the user has disassembled the entire multi-sided enclosure 100. In certain embodiments, a cube or other object may be embedded within the sixth base panel 110.

Though the sequence order may be marked clearly on the panels 102 by the coded elements 108, the direction the panels 102 move or slide may or may not be indicated on the panel 102. In addition, the direction the panels 102 move and how the panels 102 interlock may vary according to the specific embodiments. More complex multi-sided enclosures 100 may have more numerous panels 102 and consequently more complicated sequence patterns.

Typically, in order to reassemble the multi-sided enclosure 100, the user must follow the sequence code, or the coded elements 108, in reverse order. Alternatively or in addition, an additional sequence pattern, or additional coded elements 208, may be included on the reverse side of the panels 102, as illustrated. In certain embodiments, numbers maybe included on both sides of the panels 102. In an alternative embodiment, a different series of coded elements 108 forming a sequence may be represented on the reverse side of the panels 102.

The panels 102 may include holes 202 and corresponding protrusions 204 to help determine the panel sequence code of the multi-sided enclosure 100. As depicted, the protrusion 204 of side panel 102c, when inserted into the corresponding hole 202 in side panel 102d, locks the side panel 102d into place. Consequently, the protrusion 204 of side panel 102c must be removed before the user can remove side panel 102d from the multi-sided enclosure 100.

Referring now to FIG. 1 and FIG. 2, because the illustrated multi-sided enclosure 100 exemplifies a basic multi-sided enclosure 100, the preferred embodiments may be designed for preschool-level children. Therefore, the multi-sided enclosure 100 may include characteristics typical to educational toys of this developmental group. For example, the panels 102 are preferably large enough for young children to manipulate. In the depicted embodiment, the panels 102 are substantially square and may range from about 4 to about 5 inches. Secondly, the coded elements 108 are preferably large enough and bold enough, and also tactilely distinctive enough, for preschool-level children to easily see and recognize, including children with visual disabilities. Additionally, bright colors or strong contrasting colors may be useful to help children distinguish different panels 102 and the elements on the panels 102. In a more advanced embodiment, the side panels 102 may each be colored distinctively to teach children a sequence, such as the color order of the rainbow, for example.

The multi-sided enclosure 100 may also include additional elements 112 to teach supplementary principles. For instance, a multi-sided enclosure 100 may also be used to teach shape recognition. The additional elements 112 may be raised objects, such as the shapes in the depicted embodiment. Alternatively, the additional elements 112 may be pictures, sound chips, textured areas, or the like. In an alternate embodiment, the shapes may be cut out, and corresponding shaped blocks or pieces may be inserted through the cut out spaces, such as is known in the art. As mentioned, certain embodiments of the multi-sided enclosure 100 may also include a Braille transcription 114 and a deaf finger alphabet sign 113. The Braille transcription 114 and deaf finger alphabet sign 113 may assist visually or hearing impaired children in learning the educational principles taught on each multi-sided enclosure 100. In addition, the Braille transcription 114, deaf finger alphabet sign 113, and additional elements 112 may teach children to communicate with those who have disabilities and may promote awareness of disabilities among children.

FIGS. 3–8 illustrate various embodiments of panels 102 referred to in conjunction with FIGS. 1–2. The coded elements 108 are Arabic numerals with an equivalent Braille transcription 114 and deaf finger alphabet sign 113. The additional element 112 is a geometric shape represented in the amount indicated by the coded element 108. In certain embodiments, the panels 102 maybe colored, or the additional elements 108, 112 may be colored, and the panels 102 labeled with the corresponding color. The panels 102 will be discussed in the order they are removed from the illustrated multi-sided enclosure 100. Only after removing a specific panel 102 will the next panel 102 be unblocked and removable. In addition, FIGS. 3–7 illustrate both an outer visible side illustrated in FIGS. 3A–7A and an inner reverse side illustrated in FIGS. 3B–7B.

Figure 3A:
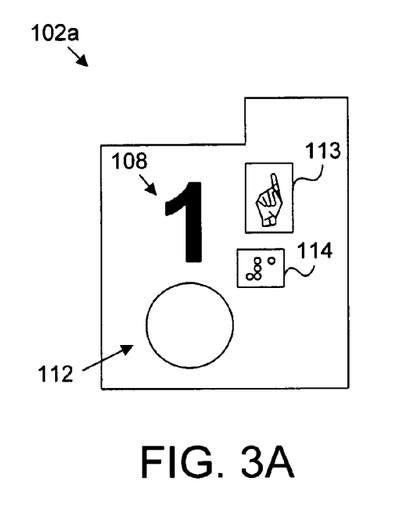
FIG. 3A is a side view of one embodiment of a first side panel in accordance with the present invention.
Figure 3B:
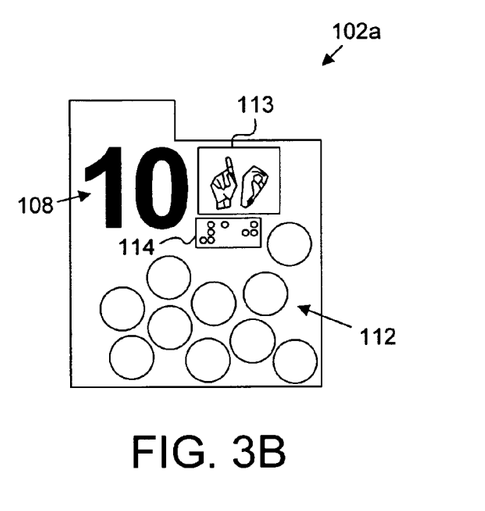
FIG. 3B is an opposite side view of one embodiment of a first side panel in accordance with the present invention.

FIGS. 3A–3B illustrate one embodiment of a first side panel 102a. The first side panel 102a may be removed from the top of the multi-sided enclosure 100 opposite the base side panel 110. The grooves 104 of the side panels 102c and 102e (FIG. 1) retain the side panel 102a in a secured position. When the first side panel 102a is in place, the other side panels 102b–e are locked into position as shown in FIG. 1. When side panel 102a is removed (FIG. 2), side panel 102b maybe slid out of place. To reassemble the multi-sided enclosure 100, the sequence order may be represented on the reverse side of the panel 102. FIG. 3B illustrates the reverse side of side panel 102a. Since side panel 102a is the first panel 102 to be removed, it is also the last panel 102 to form the multi-sided enclosure 100. Consequently, the coded element 108 is a number ten with corresponding elements 112, 113, 114.

Figure 4A:
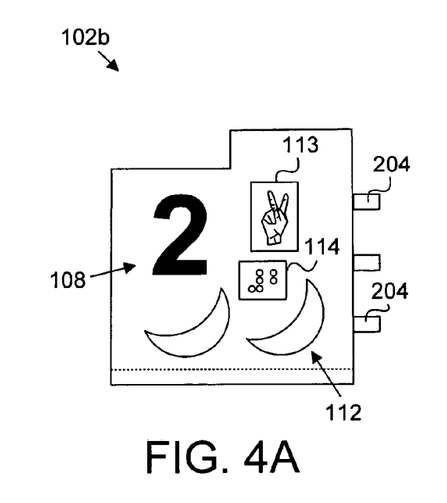
FIG. 4A is a side view of one embodiment of a second side panel in accordance with the present invention.
Figure 4B:
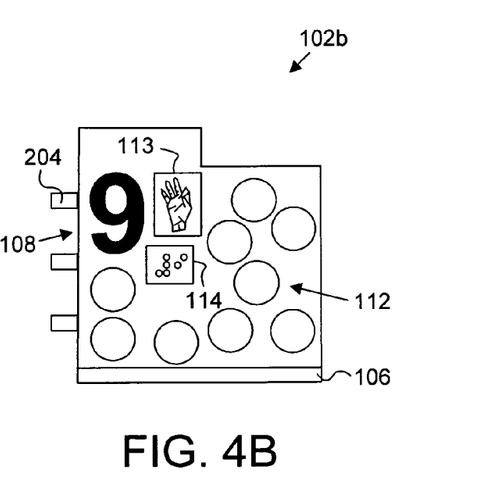
FIG. 4B is an opposite side view of one embodiment of a second side panel in accordance with the present invention.

FIGS. 4A–4B illustrate one embodiment of a second side panel 102b. Side panel 102b may include protrusions 204 to fit into holes 202 on the side panel 102c. Also, the side panel 102b may include a lip 106 to engage a groove 104 in the base panel 110. The second panel 102b is removed by sliding the panel 102b from the base panel 110 as shown in FIG. 2. When panel 102b is removed, panel 102c is no longer blocked by the protrusions 204.

Figure 5A:
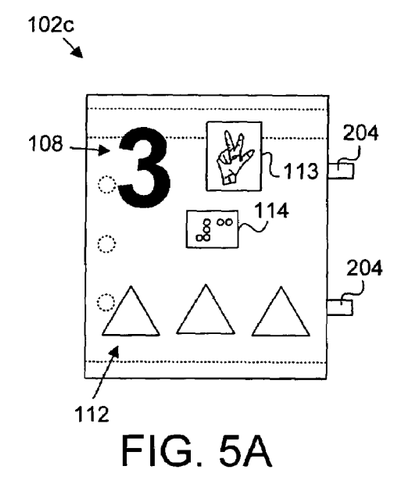
FIG. 5A is a side view of one embodiment of a third side panel in accordance with the present invention.
Figure 5B:
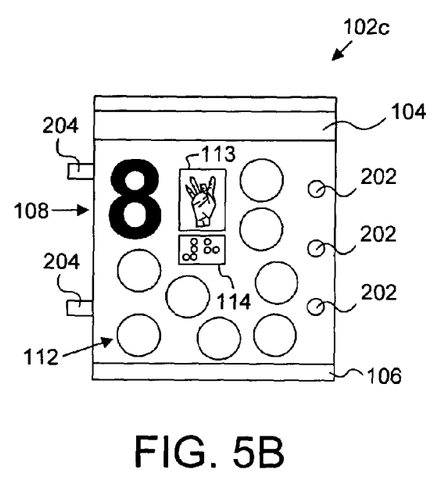
FIG. 5B is an opposite side view of one embodiment of a third side panel in accordance with the present invention.

FIGS. 5A–5B illustrate one embodiment of a third side panel 102c. The side panel 102c may include a lip 106 to slide into a groove 104 on the base panel 110. As mentioned, the side panel 102c may include holes 202 to receive protrusions 204 on side panel 102b. In addition, the side panel 102c includes protrusions 204 to lock side panel 102d into place. Furthermore, the side panel 102c may include a groove 104 to receive the side panel 102a.

Figure 6A:
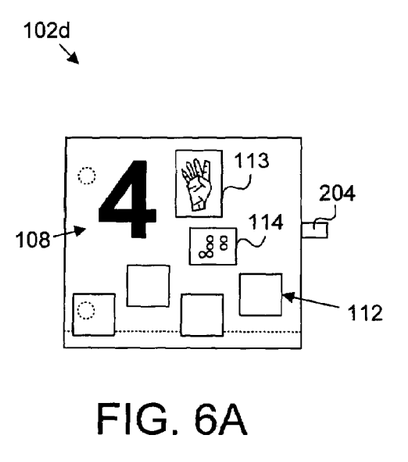
FIG. 6A is a side view of one embodiment of a fourth side panel in accordance with the present invention.
Figure 6B:
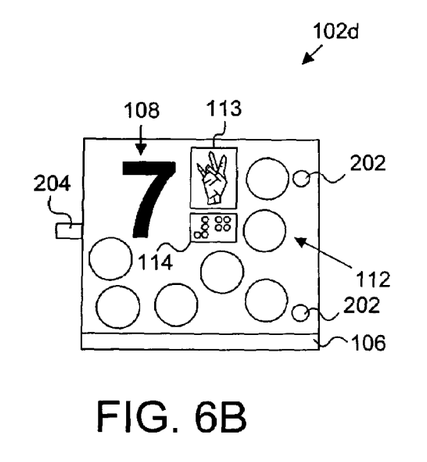
FIG. 6B is an opposite side view of one embodiment of a fourth side panel in accordance with the present invention.

FIGS. 6A–6B illustrate a possible embodiment for a fourth side panel 102d. The side panel 102d may comprise a protrusion 204 that holds the fifth side panel 102e into place. Holes 202 receive protrusions 204 of side panel 102c. The side panel 102d may farther include a lip 106 to engage the base panel 110.

Figure 7A:
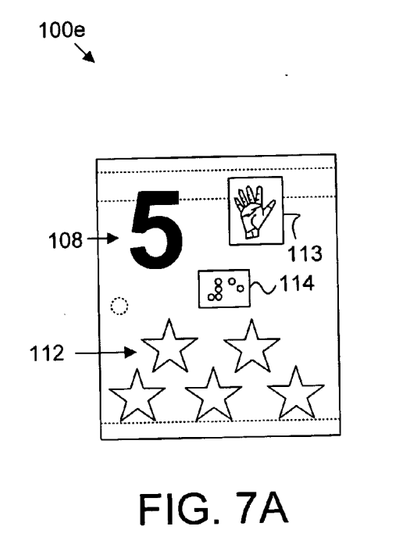
FIG. 7A is a side view of one embodiment of a fifth side panel in accordance with the present invention.
Figure 7B:
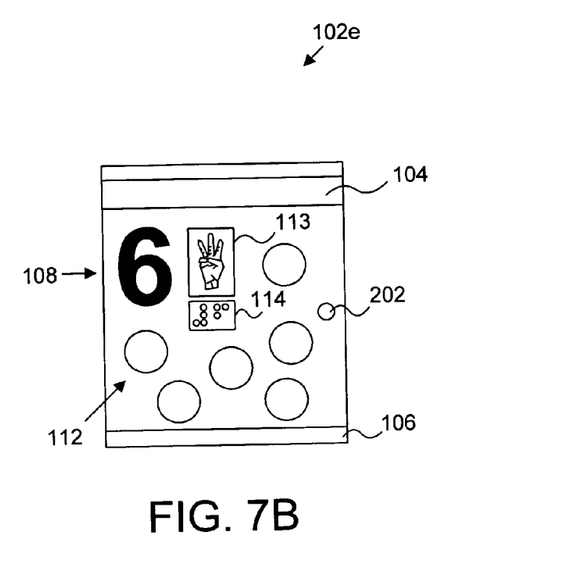
FIG. 7B is an opposite side view of one embodiment of a fifth side panel in accordance with the present invention.

FIGS. 7A–7B illustrate one embodiment of a side panel 102e. The side panel 102e may include a hole 202 to receive the protrusion 204 of side panel 102d. Similar to side panel 102c, side panel 102e may include a groove 104 to receive the side panel 102a. A lip 106 may engage the base panel 110.

Figure 8:
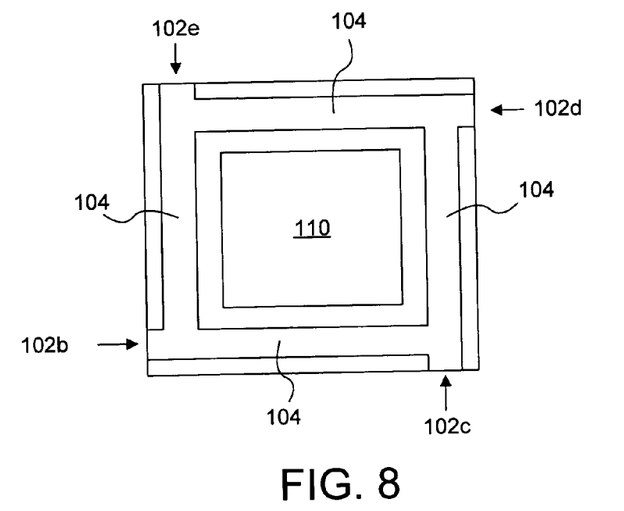
FIG. 8 is a side view of one embodiment of a base side panel in accordance with the present invention.

FIG. 8 illustrates a top view of one embodiment of a base side panel 110, or a sixth panel 102, of a multi-sided enclosure 100. The shape of the base panel 110 may be substantially square. Grooves 104 may line the edges of the base panel 110 and are preferably designed to permit the separate panels 102 with corresponding lips 106 to be slid into place. In one embodiment, a cube with educational material is attached to the base side panel 110.

In an alternative embodiment, holes or slots (not shown) may line the edges on the base side panel 110 in addition to or in place of the grooves 104. The holes are preferably designed to allow a separate panel 102 with corresponding protrusions to be inserted into the holes to secure the adjacent panel 102. The grooves 104 and holes 108 contribute to the sequence code of the multi-sided enclosure 100.

The base side panel 110 may have any suitable configuration that corresponds to adjacent panels 102.

Figure 9:
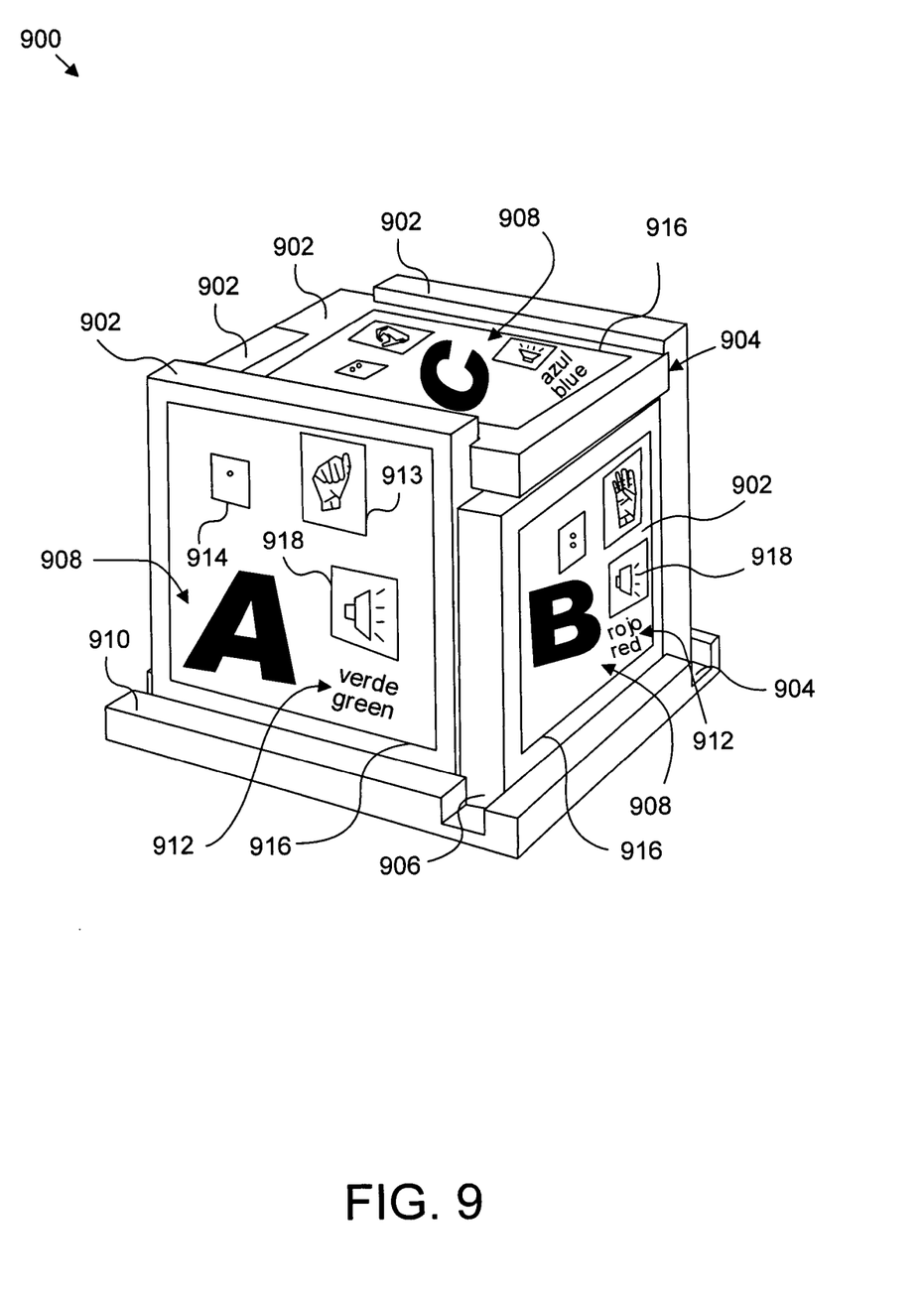
FIG. 9 is a perspective side view of an alternative embodiment of a multi-sided enclosure in accordance with the present invention.

FIG. 9 illustrates one embodiment of a multi-sided enclosure 900. The multi-sided enclosure 900 may represent another level available in a series of multi-sided enclosures 900. In certain embodiments, the panels 902 of the multi-sided enclosure 900 may be more numerous than the panels 102 of the basic multi-sided enclosure 100. Consequently, the sequence code to disassemble the multi-sided enclosure 900 may require more moves than the multi-sided enclosure 100. To indicate the sequence code of the multi-sided enclosure 900, the coded elements 908, in one embodiment, may comprise alphabet letter sequences. The letters may be represented in Latin, Braille, sign language, and the like. In certain embodiments, Braille transcriptions 914 may appear on every multi-sided enclosure 900 in a series, as well as deaf finger alphabet signs 913. More advanced multi-sided enclosures 900 may incorporate various languages 912.

In certain embodiments, the multi-sided enclosure 900 may include apparatus to change or alter the coded element 908 and/or corresponding elements 912, 913, 914. In the depicted embodiment, the multi-sided enclosure 900 includes a removable insert 916. The removable insert 916 enables the user to remove the coded element 908 representing the panel sequence code and to apply a new sequence or coded element 908 to the existing coded panels 902. The insert 916 may be reversible in certain embodiments. In alternative embodiments, the multi-sided enclosure 900 may include an electronic display panel, a hologram, a revolving element, or other device to alter the elements 908, 912, 913, 914 on the side panels 902.

To correspond to the number of panels 902, the multi-sided enclosure 900 may include an advanced panel sequence code with corresponding coded elements 908. In one embodiment, the multi-sided enclosure 900 may include a sequence code of twelve moves. Additionally, the multi-sided enclosure 900 may also include both inside panels 902 and outside panels 902 to make the sequence code more complex.

A multi-sided enclosure 900 may be designed to teach children to communicate in multiple languages. In one embodiment, the multi-sided enclosure 900 may include additional elements 912 that include the words for the colors and the numbers in Spanish and English. A preferred embodiment may also include a Braille transcription 914 of the represented words. Another additional element 912 may be a sound chip 918 that teaches how to pronounce words. In a preferred embodiment, the sounds may represent the words, ideas, or coded elements 908 visually represented on the multi-sided enclosure 900.

Other embodiments of the multi-sided enclosure 900 may use other variations of sequence for opening the box or removing/assembling the side panels 902. For example, the patterns of the traditional Japanese puzzle boxes, or other such arrangements, may also be used.

Figure 10:
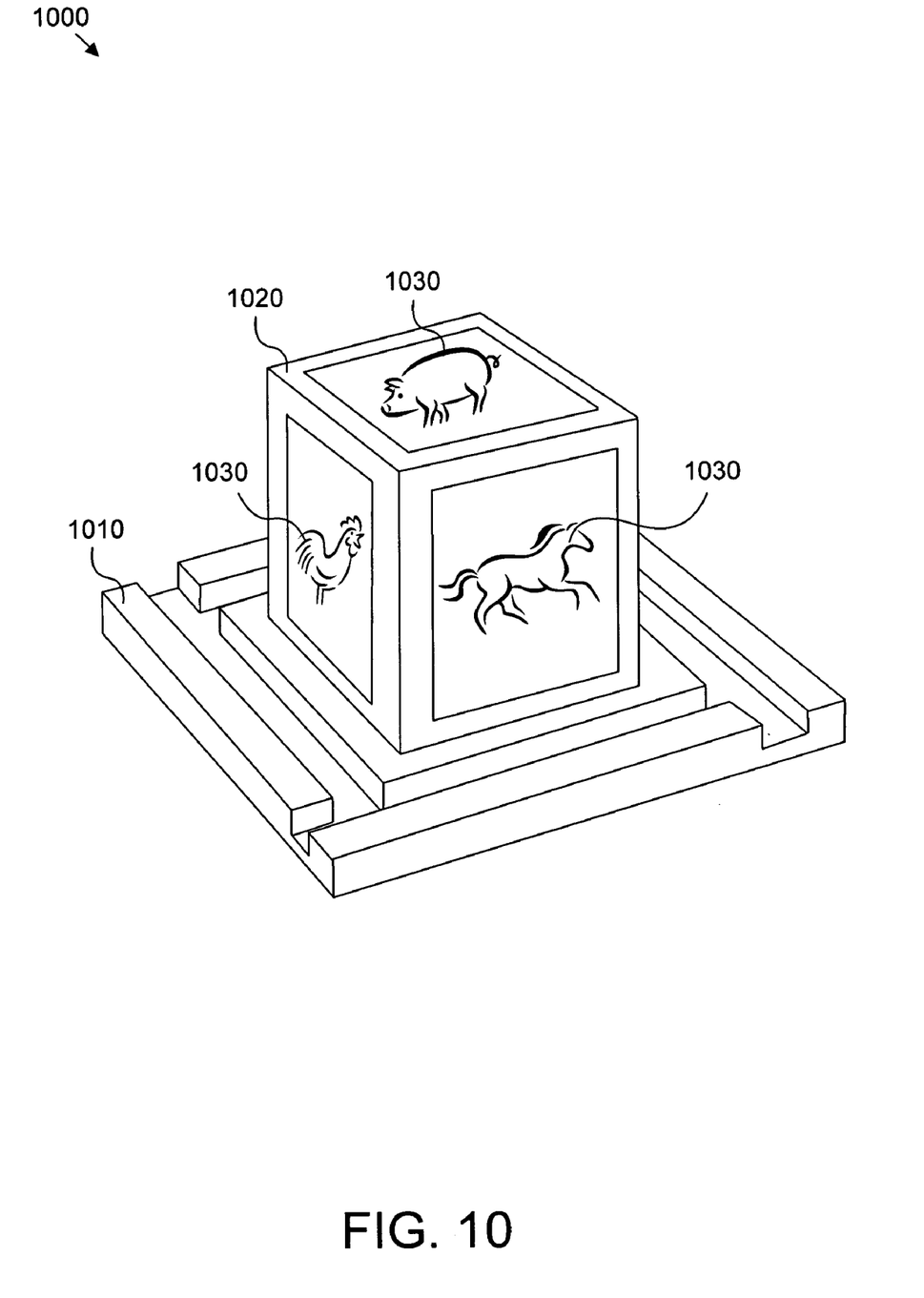
FIG. 10 is a perspective view of one embodiment of a base side panel with an embedded cube in accordance with the present invention.

FIG. 10 illustrates a disassembled box 1000. As mentioned previously, a multi-sided enclosure 1000 may contain an object, surprise, or a hidden reward disposed within the multi-sided enclosure 1000. One example of an object enclosed within the multi-sided enclosure 1000 may be a cube 1020 with educational material represented on the exterior of the cube 1020. In one embodiment, the surprise may be embedded within the base side panel 1010 of a multi-sided enclosure 1000. Alternatively, the cube 1020 may be unattached, or may be attachable with a fastener such as Velcro®, magnets, or the like.

In certain embodiments, the cube 1020 may teach educational material that advances with a particular multi-sided enclosure series or that is geared toward the same educational level as a particular multi-sided enclosure 1000. For instance, in one embodiment of a basic multi-sided enclosure 100, a cube 1020 contained within the box 100 may include pictures or representations 1030 of familiar animals, such as different house pets, on each side of the cube 1020. As the educational level of the multi-sided enclosure increases, the pictures or representations 1030 on the cube 1020 may become more advanced as well. One example of educational advancement may be a first cube 1020 that represents house pets, a second cube 1020 that teaches farm animals, and a third cube 1020 that shows wild animals or endangered species. The pictures or representations 1030 of the animals may be complete pictures of the animals or may be other simple representations of the animals, such as an outline of the animal or the tracks of an animal.

One embodiment of a cube 1020 may include pictures 1030 of different animals on each side of the cube 1020 with one or more sound chips (not shown) embedded behind the pictures 1030. Accordingly, pressing different portions of the picture 1030 activates the sound chip. For example, pushing on the nose of a representation 1030 of a bear may cause the sound chip to emit a growl-like sound. In certain embodiments, the sound chip is located within the cube 1020 and has a replaceable battery. One side of the cube 1020 may be removable to provide access to the battery. One or more screws may fasten the removable side to the cube 1020 to secure any loose parts. Additionally, the cube 1020 may be included with a multi-sided enclosure 1000 of the present invention, or the cube 1020 may comprise a child's toy available separately from the multi-sided enclosure 1000.

In an alternative embodiment, an enclosed object may comprise another multi-sided enclosure 100. Thus, the present invention may provide a variety of puzzles and educational material to enhance the educational development of children. The multi-sided enclosure 100 may be made from a variety of materials, such as plastic, wood, and the like. Preferably, the material is suitable for the targeted developmental group. Plastic may be a preferred material for the illustrated embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An educational toy for teaching sequencing principles, the educational toy comprising:
   a multi-sided enclosure formed with a plurality of panels configured to interlock with each other in a sequential pattern, the multi-sided enclosure having an interior;
   the interior comprising a chamber sufficiently large to receive an object therein; and
   a coded element represented on at least one of the panels.

2. The educational toy of claim 1, wherein the multi-sided enclosure comprises a puzzle box.

3. The educational toy of claim 1, wherein the panels comprise grooves and lips configured to uniquely engage adjacent panels.

4. The educational toy of claim 1, wherein the panels further comprise holes and protrusions configured to prevent non-sequential removal of panels.

5. The educational toy of claim 1, wherein the coded element is an element in a series forming a sequence.

6. The educational toy of claim 1, wherein the coded element indicates the removal order of the panels.

7. The educational toy of claim 1, wherein the coded element is a number.

8. The educational toy of claim 1, wherein the coded element is a textured Braille character.

9. The educational toy of claim 1, wherein at least one panel contains at least one additional element selected from the group consisting of raised objects, pictures, sound chips, textured areas, and alphabetic signs.

10. The educational toy of claim 1, further comprising an insert removably connected to the outer surface of at least one panel, the insert configured with a coded element.

11. The educational toy of claim 1, further comprising a sound chip embedded in at least one panel.

12. The educational toy of claim 11, wherein the sound chip is configured to emit a signal representing a coded element.

13. The educational toy of claim 1, further comprising a series of multi-sided enclosures configured with various coded elements configured to increase the difficulty level of the toy.

14. A system for teaching sequencing principles, the system comprising:
   a multi-sided enclosure with a plurality of panels configured to interlock with each other in a sequential pattern, the multi-sided enclosure having an interior;
   at least one of the panels configured with a coded element; and
   an object disposed within the interior of the multi-sided enclosure, the object having educational material represented thereon.

15. The system of claim 14, wherein the panels comprise grooves and lips configured to uniquely engage adjacent panels.

16. The system of claim 14, wherein the panels further comprise holes and protrusions configured to prevent non-sequential removal of the panels.

17. The system of claim 14, wherein the object comprises a cube.

18. The system of claim 14, wherein the object further comprises a sound chip.

19. The system of claim 14, further comprising a series of multi-sided enclosures configured with various coded elements configured to increase the difficulty level of the toy.

20. A method for teaching sequencing principles, the method comprising:
   providing a multi-sided enclosure formed with a plurality of panels configured to interlock with each other in a sequential pattern, the multi-sided enclosure having an interior;
   the interior comprising a chamber sufficiently large to receive an object therein;
   configuring at least one of the panels with a coded element; and
   assembling the multi-sided enclosure according to the sequence indicated by the coded element on the panel.

21. The method of claim 20, wherein the method comprises providing a plurality of multi-sided enclosures to form a series of multi-sided enclosures with an increasingly difficult educational level.

\* \* \* \* \*